United States Patent [19]

Harris

[11] 3,973,098
[45] Aug. 3, 1976

[54] PISTON RING FORMING METHOD
[75] Inventor: Ralph E. Harris, Greens Fork, Ind.
[73] Assignee: Dana Corporation, Toledo, Ohio
[22] Filed: Jan. 10, 1975
[21] Appl. No.: 540,150

[52] U.S. Cl. ............................. 219/153; 29/156.6; 148/150; 219/50; 219/161
[51] Int. Cl.² ...................... B21J 5/08; B23P 15/06
[58] Field of Search ................. 29/156.6, 50, 10.57, 29/153, 161, 57; 148/150

[56] References Cited
UNITED STATES PATENTS

| 458,177 | 8/1891 | Lemp | 219/161 |
|---|---|---|---|
| 746,442 | 12/1903 | Bates | 219/57 X |
| 1,295,147 | 2/1919 | Flammang | 29/156.6 |
| 1,458,248 | 6/1923 | Seifert | 29/156.6 |
| 1,783,047 | 11/1930 | Marshall | 219/50 X |
| 2,280,552 | 4/1942 | Somes | 148/150 |
| 3,757,413 | 9/1973 | Craik | 29/156.6 X |

Primary Examiner—J. V. Truhe
Assistant Examiner—N. D. Herkamp
Attorney, Agent, or Firm—Richard D. Emch

[57] ABSTRACT

A method and apparatus for forming piston rings are disclosed. A split piston ring made by conventional processes is locally heated along its inside surface for a short distance either side of the split. This causes a short length of the ring on either side of the split to curl into a slight inward protrusion due to internal yielding of the restrained heated area and subsequent tensioning during cooling. The inwardly curved configuration prevents catching of the ring's ends on gas ports of ported cylinder engines.

12 Claims, 5 Drawing Figures

U.S. Patent    Aug. 3, 1976    3,973,098
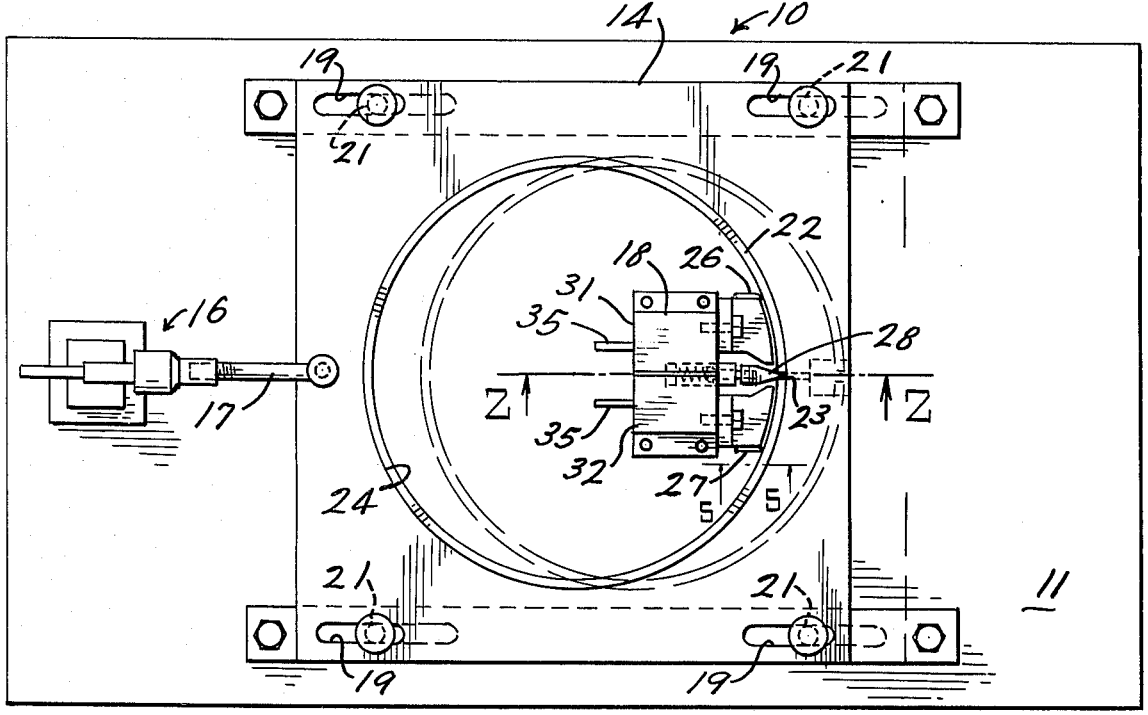
FIG-1-
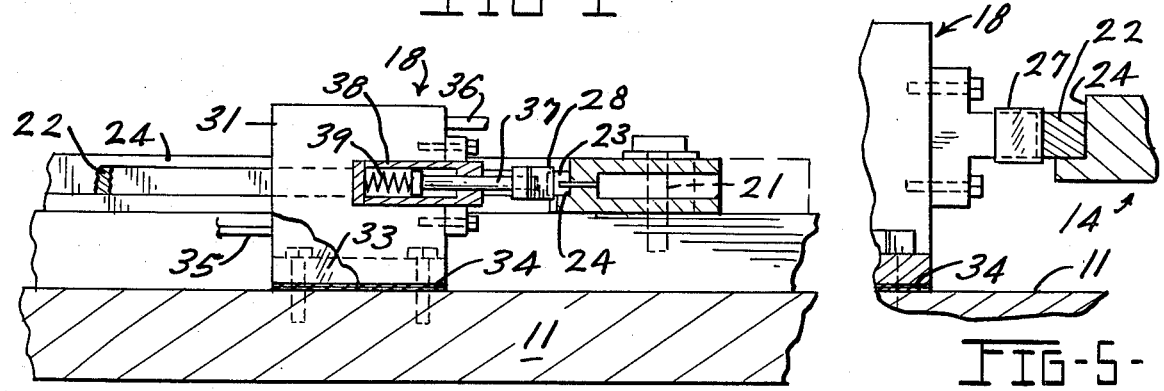
FIG-2-
FIG-5-
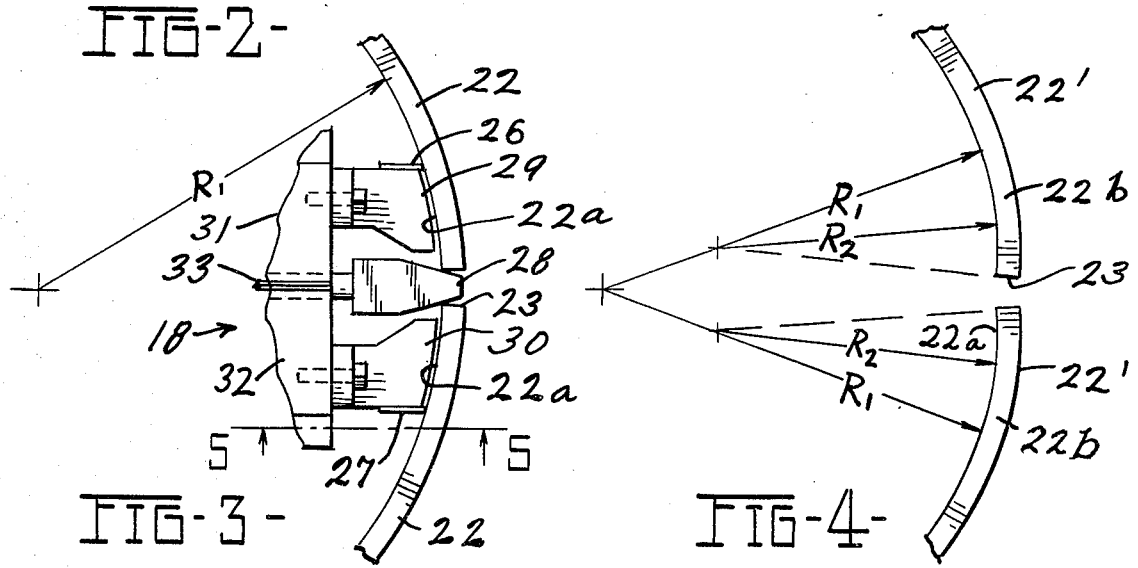
FIG-3-
FIG-4-

PISTON RING FORMING METHOD

BACKGROUND OF THE INVENTION

The invention relates to a piston ring forming method and apparatus, and more particularly to a method and apparatus for inducing a slight additional inward curvature, often called negative point protrusion, on either side of the split of a piston ring.

The split piston rings formed by conventional processes are generally somewhat out of round in order that the ring exert an even pressure around the cylinder wall when it is compressed and installed therein. Sometimes the ends of such a ring tend to spring outwardly to a greater extent than the rest of the ring due to traditional manufacturing techniques. This tendency can cause problems in internal combustion engines having gas ports within the cylinder walls. The ends of a ring may spring slightly outwardly as they pass over a valve port opening, then snag upon the upper or lower edge of the gas port as the piston continues to travel. Such "port clipping" causes scuffing and scoring of both the ring and cylinder, which can cause serious difficulties and result in early wear. It is therefore desirable to produce a slight additional inward curvature on the piston ring at each end adjacent the split. This negative point protrusion of the ring brings the ring's ends slightly inward within the cylinder so that they cannot catch on the edges of the gas ports.

Previously, face lapping of a ring, wherein the ring is compressed into a cylinder similar to a firing cylinder and reciprocated therein with a fine grinding compound, was sufficient to prevent serious problems of ring end snagging in service as described above. The stresses within the ring would be more or less equalized during lapping by removal of material from areas which tend to exert greater outward pressure, including the ring ends. However, certain newer engines have placed piston rings under more demanding conditions, often requiring actual recession of the ring ends to avoid snagging on ported valves. Particularly in turbocharged engines, which involve much higher pressures within the firing cylinders, pressurized gases entering the space between the piston and the ring exert greater outward pressures on the ring causing it to push outwardly on the cylinder wall with greater force. As a result, the ring ends are forced outwardly enough to allow them to catch on the ported valves of the cylinder wall.

Special grinding operations such as "cam" profile grinding have been used to remove material from the outer faces of ring ends, resulting in a recession of the ring face at its ends. Also, negative point protrusion of piston ring ends has been done by cold bending. However, these methods can result in irregularities in surface finish, uneven bending, and some loss of ring strength. The methods are also generally more costly than that of the present disclosure.

Heat treatments have been used in a variety of ways in the manufacture of piston rings. See, for example, U.S. Pat. Nos. 2,487,587, 2,280,552 and 3,377,682. In U.S. Pat. No. 2,487,587, ring edges are hardened through induction heating. Pat. No. 2,280,552, also relating to ring hardening by heat treating, recognizes that a split ring expands as a result of localized heat treatment. In U.S. Pat. No. 3,377,682, a coil of rings is radially stretched, then heat treated to "set" the stretch. In U.S. Pat. No. 2,081,257, packing rings are deformed into a smaller radius under pressure, then heated to keep them in the deformed configuration.

SUMMARY OF THE INVENTION

The present invention provides a piston ring shaping method and apparatus capable of quickly and efficiently deforming the piston ring ends into a slight inward curl, or negative point protrusion, in the area immediately adjacent the split.

According to the method of the invention, a piston ring which has been completed according to conventional processes, including face lapping, is subjected to rapid heating along its inside surface for a short distance on either side of the split. The rapid heating permeates only a portion of the depth of the ring, causing the inner side of the ring to tend to expand. The heated surface, however, cannot expand because of its restraint by the remainder of the thickness of the ring and by a fixture which may be used to confine the ring. The inner side of the ring in the heated area therefore goes into compression and yields, i.e., the molecules slip and the affected area is no longer under compression. As the heated portion of the ring cools, it is brought into tension. The tension causes the short heated length of the ring on either side of the split to curl slightly inwardly to a deformed position with the ring ends on the order of a few thousandths of an inch from their original position. Following deformation, the physical properties of the ring such as grain orientation and hardness are not noticeably different.

In a preferred form of the invention, a piston ring is heated by means of electric current. The ring is positioned to be engaged at both tips on either side of the split, at the inside surface of the ring, by a bridging contact. A pair of electrodes of narrow contact area are positioned one on either side of the split an equal distance therefrom, also on the inside of the ring. When electrical energy is applied, current flows from one electrode through a portion of the ring, through the bridging contact and through the other ring portion to the electrode of opposite charge. Electrode arrangement can alternatively include two electrodes of similar charge on either side of the split, with a center "ground" electrode of opposite charge contacting both ends of the ring at the split. In either case, electrical energy is applied for a short period, from a fraction of a second to several seconds, depending upon the magnitude of the current, the ring size and the amount of negative protrusion desired. Such use of direct contact electrical resistance heating obtains the desired ring profile without any material removing operations, is versatile in that the magnitude and geometry of the resulting negative point protrusion can be easily varied, and leaves a ring surface which is free of irregularities in surface finish. In addition, the method and apparatus are economically implemented and easily automated.

The invention also encompasses a piston ring formed according to the above-described method. The physical characteristics of such a piston ring are superior to those of rings shaped according to prior art negative point protrusion and grinding methods in that the radius of curvature of the negatively protruded portions of the ring is substantially uniform, the finish of the ring is protected from damage caused by mechanical gripping and bending equipment, and the internal structure of the ring in the newly shaped area is left essentially unchanged, assuring continuing strength and wear resisting qualities.

DESCRIPTION OF THE DRAWINGS

FIG. 1 is a schematic plan view showing the apparatus and indicating the method of the present invention;

FIG. 2 is an enlarged sectional view taken along the line 2—2 of FIG. 1;

FIG. 3 is an enlarged view showing a portion of the apparatus of FIG. 1, with some parts removed for clarity, and illustrating the method of the invention;

FIG. 4 is a schematic, somewhat exaggerated representation showing the piston ring of FIG. 3 following a shaping operation performed according to the invention; and FIG. 5 is a sectional view taken along the line 5—5 of FIG. 3.

DESCRIPTION OF THE PREFERRED EMBODIMENT

In the drawings, FIG. 1 shows a piston ring shaping apparatus according to the invention and generally indicated by the reference number 10. The apparatus includes a base plate 11, a slidable piston ring retaining fixture 14 which is operated by engaging means 16, and ring heating means 18 affixed to the base 11. The fixture engaging means 16 preferably comprises a connecting rod 17 linked to a pneumatic or hydraulic cylinder (not shown), or any other reciprocal mechanical driving means. The slidable fixture 14 may be guided on the base plate 11 by means of slotted holes 19 and pins 21 extending upward from the base plate 11 and closely fitted within the holes 19, or by other suitable guiding means. A piston ring 22 with its gap 23 oriented to the right in FIG. 1 is placed in the retaining fixture 14 when the fixture 14 is in an unengaged loading position to the right in FIG. 1, shown by dashed lines. The ring 22 is inserted into a circular opening 24 of the fixture 14, and is in a somewhat compressed condition since the opening 24 is smaller than the uncompressed diameter of the ring 22. The engaging means 16 then draws the fixture 14 to the left, to the position shown in solid lines in FIG. 2, wherein the interior face of the piston ring 22 is engaged by the heating means 18. The fixture 14 is preferably non-metallic, at least in the areas contacting the ring 22. The piston ring 22 is one which has been completed according to conventional processes, including face lapping, so that the entire face of the ring is smooth prior to the shaping operation described herein.

The heating means 18 preferably utilizes electrical resistance heating, through electrodes 26 and 27 of opposite charge. The electrodes, shown engaged by the piston ring 22 in FIG. 1, contact the ring with a bias force of preferably about 10 pounds each. The bias force is provided by the engaging means 16.

The heating means 18 and its engagement with the ring 22 are shown in greater detail in FIGS. 3 and 5. A spring-loaded bridging contact 28 with a preferably tapered shape engages the interior surfaces of the ring at both sides of the split, making contact at the corners defined by the ring ends. The purpose of the bridging contact 28 is to provide electrical continuity between the two ring portions being heated, so that current can flow from one of the electrodes 26 and 27 across the interior surface of the ring 22 to the other. The electrodes 26 and 27 each form a narrow line of contact down the interior face of the ring 22, as shown in FIGS. 3 and 5. Each of the electrodes 26 and 27 is supported by a contact block 29 or 30 of electrically conductive material. The contact blocks 29 and 30, which are shaped in accordance with the curvature of the ring 22 but spaced therefrom as shown in FIG. 3, act as heat sinks for heat convected and radiated from the heated ring 22. The blocks 29 and 30 are affixed to respective electrically conductive mounting blocks 31 and 32, separated from one another by an insulator 33. Power is supplied to the electric ring heater 18 by means of a pair of electrical conductors of opposite charge (not shown) connected to the contact blocks 31 and 32 and to a power source (not shown), and the blocks 31 and 32 are accordingly insulated from tha base plate 11 by insulator sheets 34.

For cooling of the heating means 18, including the mounting blocks 29 and 30, coolant passages are provided through the blocks 31 and 32. Water or other coolant flows into the blocks through inlet conduits 35 (see FIGS. 1 and 2) and exits through outlet conduits 36.

As indicated in FIG. 2, the bridging contact 28 is connected to a plunger 37 which is slidable within a plunger sleeve 38 of electrically insulative material, seated within a cavity formed between the two blocks 31 and 32. Inside the plunger sleeve 38, a compression spring 39 provides a bias force on the bridging contact 28 against the ends of the piston ring 22. The bias force preferably exceeds the 10 force exerted by the contacts 26 and 27 against the interior ring surface.

As an alternative electrode arrangement, the central bridging contact 28 can be appropriately connected as an electrode of one charge, serving as a "ground" electrode, and the outer electrodes 26 and 27 can carry the opposite charge. In this way, current flow through the ring 22 can be regulated individually on each side of the gap 23 for individual shape control, if desired.

When electrical energy is applied through the contacts 26 and 27 to the piston ring 22, the current flows between the contacts along the interior surface 22a of the ring 22, only slightly penetrating the depth of the ring. This causes the area along the current flow path to heat up immediately, tending to expand. The remaining thickness of the ring, however, prevents expansion and the interior surface 22a goes into compression. Although the restraining effect of the unheated thickness of the ring is sufficient to prevent expansion, the confinement of the ring provides additional restraint. Since the ring is unable to expand, the internal structure of the ring yields and the affected area is no longer under compression. As the ring cools, the affected area 22b tends to contract and goes into tension. As indicated in FIG. 4, when the contacts are removed and the shape-altered ring 22' is removed from the confining fixture 14, the tension along the interior surface 22a of the ring draws the ring ends inwardly, defining a generally constant radius $R_2$ of curvature smaller than the radius $R_1$ of the remainder of the ring 22'. The altered ring shape is shown somewhat exaggerated in FIG. 4.

The amount of negative point protrusion obtained on a piston ring is determined by a number of variables: the diameter of the ring; the distance between the electrodes, i.e., the length of the affected ring end portion; the thickness of the ring; the heating time; and the temperature of the affected area during heating. The temperature reached during heating is controlled by the magnitude of the electric current applied as well as the time duration of application.

In a particular application of the method of the invention, piston rings of 9 1/16 inch diameter and .300 inch thickness from face to interior surface were used. The electrodes were spaced about 1 ** inch from the gap. Electrical power settings were regulated to provide negative point protrusion of 0.0015 inch to 0.0035 inch, with power applied from about ½ second to 2 seconds. The temperatures of the heated portions of the ring were approximately 400°F.

During other trials of negaitive point protrusion using direct contact resistance heating, it was found that temperatures ranged from about 200° to 1500°F, with the temperature preferably maintained between 500° and 1000°F. For a piston ring of about 0.150 inch thickness, the heating depth should be about 0.030 inch. The heating depth should always be less than half the ring thickness, and is preferably in the range of about twenty per cent of the thickness. This is controlled by the temperature as well as the time duration of heating. The time duration of heating may be from about ½ second to 10 seconds, but is preferably between about ½ second and 2 seconds. The distance between each electrical contact and the adjacent ring end should be about five to twenty per cent of the diameter of the ring. Electric power required for heating is approximately 3 to 5 kilowatts at a frequency of about 450 kilohertz. Generally the desired amount of negative point protrusion is about .001 to .002 inch.

Flame heating and electrical induction heating were also used to heat piston rings for negative point protrusion. Both of these heating methods were successful, providing the desired change in ring shape, but the results were not as consistent as those obtained with direct contact resistance heating.

I claim:

1. A piston ring shaping apparatus, comprising: a ring retaining fixture having means for retaining a split piston ring in position for shaping; and direct contact electrical resistance heating means for heating a portion of the inside surface of the piston ring on either side of the split, said means comprising positive and negative electrical contacts adapted for engagement with the inside surface of the ring, wherein said positive electrical contact is positioned for contact with the piston ring on one side of the split, said negative contact is positioned for contact with the ring on the other side of the split, and a bridging conductor contact is positioned for engagement with both ends of the ring at the split.

2. The apparatus of claim 1 wherein said ring retaining means of said fixture includes a circular opening of a diameter smaller than the uncompressed diameter of said piston ring, for receiving said piston ring in a somewhat compressed condition.

3. The apparatus of claim 1 wherein said ring retaining means is slidable into a position wherein a retained ring is in engagement with said heating means.

4. A method for bending inward the ends of a formed piston ring such that a portion of the length of the ring on either side of the ring gap defines a smaller radius of curvature than the remainder of the ring, comprising:
applying heat to the inside surface of the ring along said portions of the length of the ring to a depth less than half the thickness of the ring, to a temperature sufficient and for a period of time sufficient to cause the internal structure of the heated portion of the ring to yield under thermal compression; and allowing the heated portion of the ring to cool.

5. The method of claim 4 wherein said heat applying step comprises passing an electrical current along the inside surface of the ring.

6. The method of claim 4 which further includes the step of confining the piston ring into a fixed position prior to heating.

7. A piston ring shaped according to the method of claim 4.

8. A method for effecting negative point protrusion of a piston ring, comprising heating a portion of the inside surface of the ring on either side of the ring gap by passing electrical current through a portion of the depth of the ring adjacent the inside surface, through a portion of the length of the ring on either side of the gap for a predetermined time period, confining at least a portion of the piston ring to a fixed position prior to the application of the electric current, and cooling the heated ring.

9. A piston ring shaped according to the method of claim 8.

10. A piston ring shaping apparatus, comprising: a ring retaining fixture having means for retaining a split piston ring in position for shaping; and direct contact electrical resistance heating means for heating a portion of the inside surface of the piston ring on either side of the split, said means comprising positive and negative electrical contacts adapted for engagement with the inside surface of the ring, wherein an electrical contact of one charge is positioned to engage the inside surface of the ring at both sides of the ring split and a pair of contacts of the other charge are positioned to engage the inside surface of the ring at two locations, one on either side of the ring split and spaced therefrom.

11. The apparatus of claim 10 wherein said ring retaining means of said fixture includes a circular opening of a diameter smaller than the uncompressed diameter of said piston ring, for receiving said piston ring in a somewhat compressed condition.

12. The apparatus of claim 10 wherein said ring retaining means is slidable into a position wherein a retained ring is in engagement with said heating means.

* * * * *